United States Patent Office 3,492,856
Patented Feb. 3, 1970

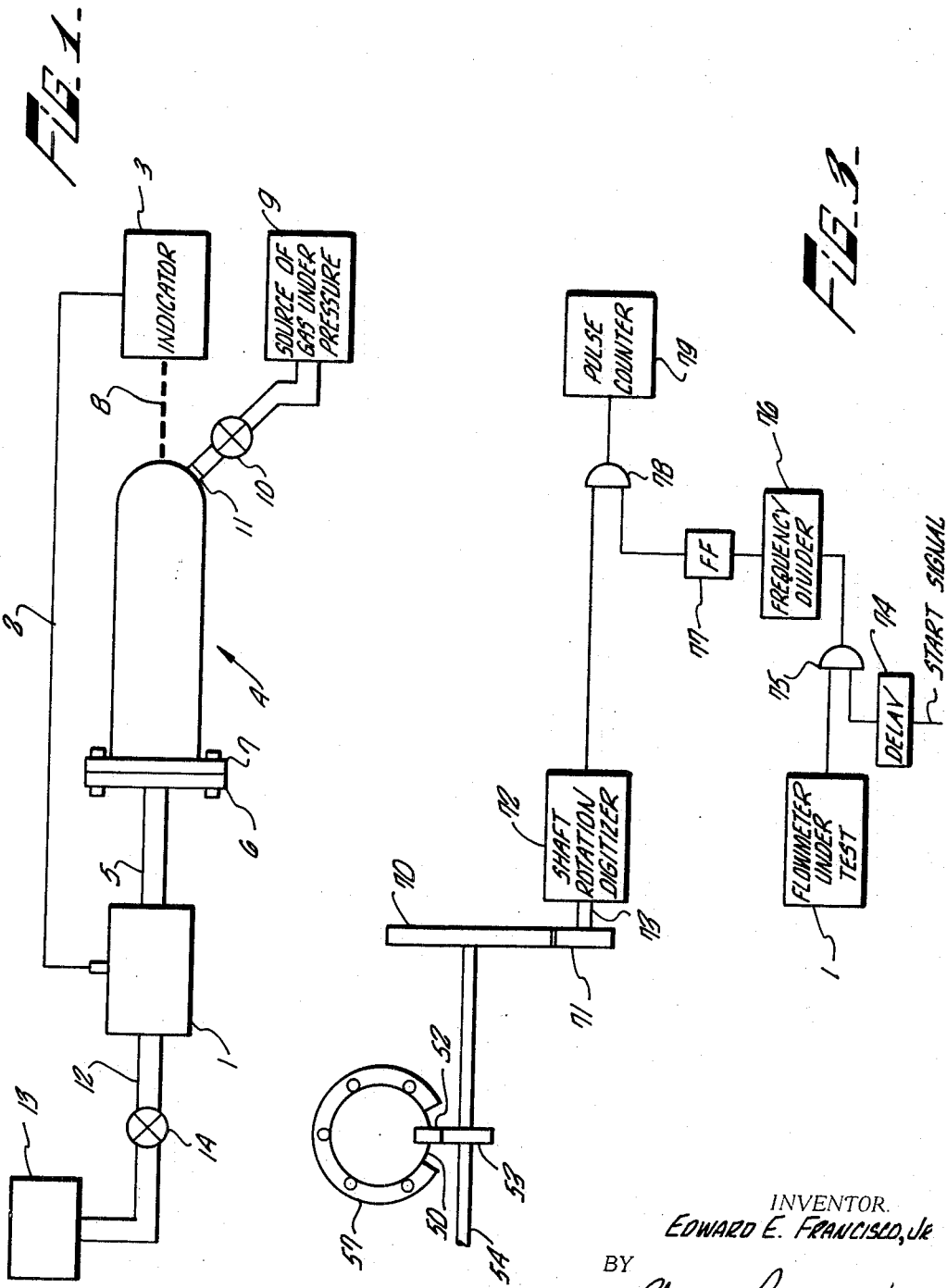

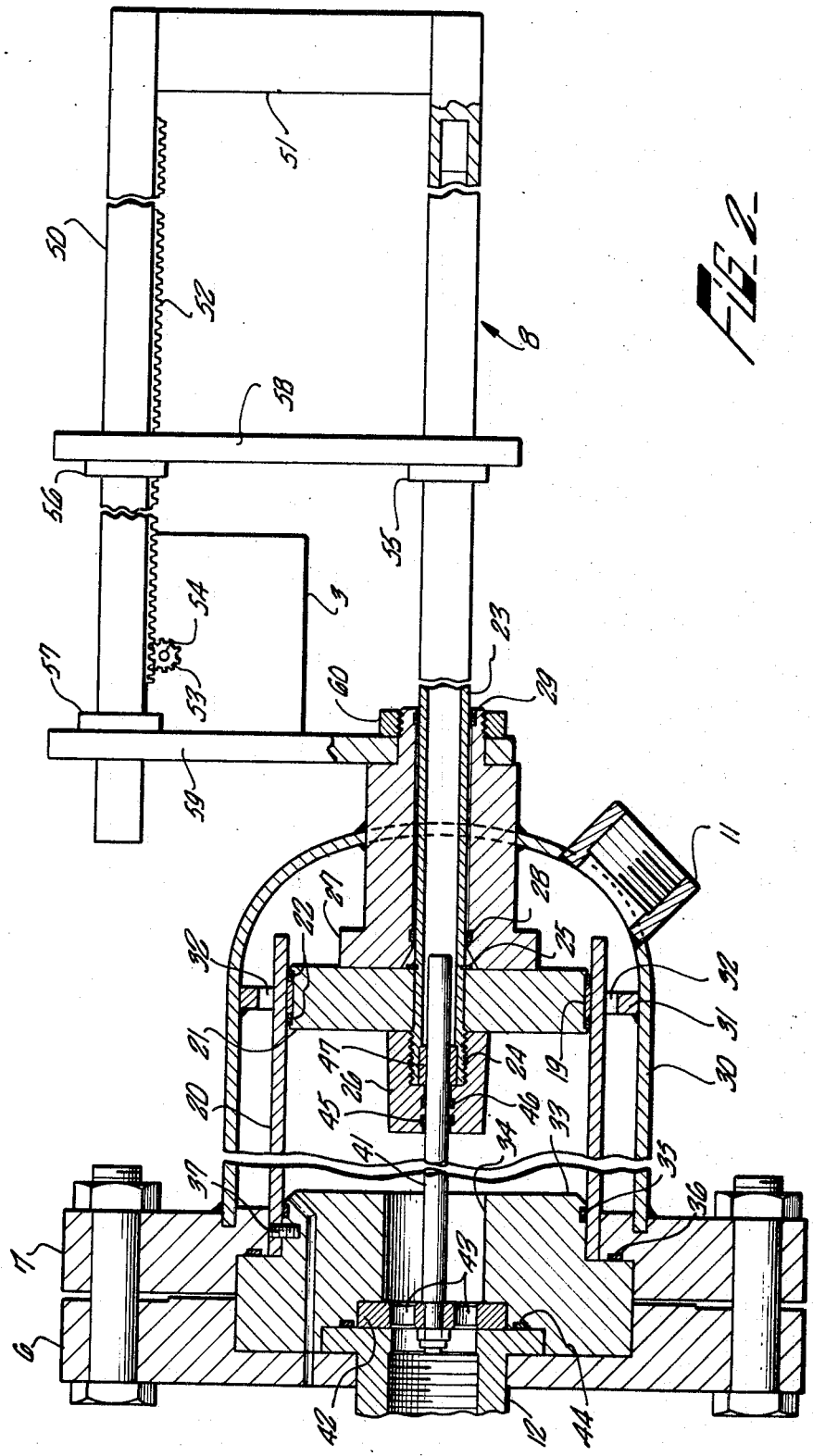

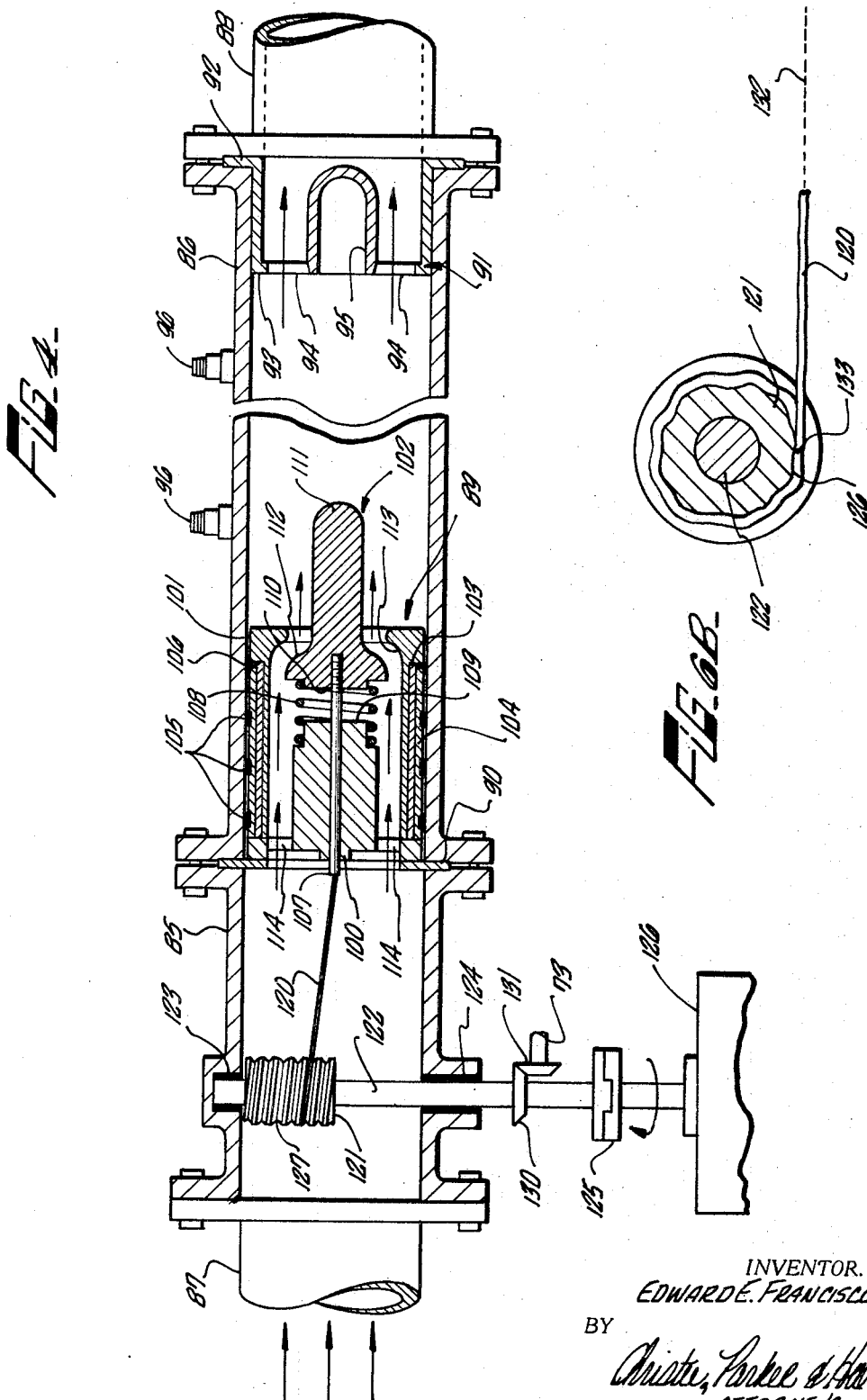

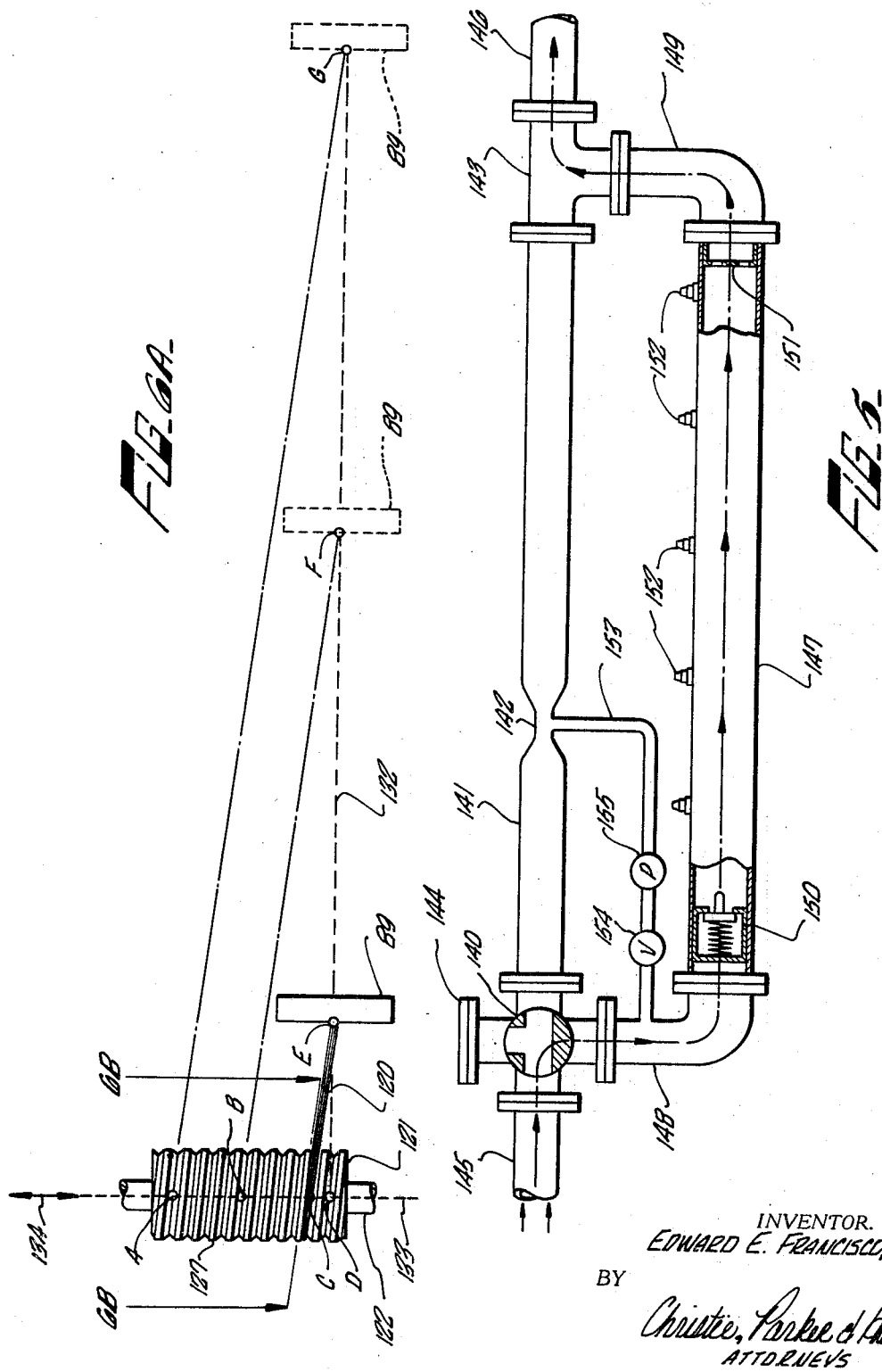

3,492,856
APPARATUS FOR DETERMINING THE FLOW CHARACTERISTICS OF A VOLUMETRIC FLOWMETER
Edward E. Francisco, Jr., Phoenix, Ariz., assignor to Flow Technology, Inc., Tempe, Ariz., a corporation of Arizona
Continuation-in-part of application Ser. No. 653,089, July 13, 1967. This application Sept. 6, 1968, Ser. No. 767,572
Int. Cl. G01f 25/00
U.S. Cl. 73—3
33 Claims

ABSTRACT OF THE DISCLOSURE

A piston is adapted to move as a fluid barrier through a conduit connected in series with a flowmeter under test. The piston is mechanically coupled to a displacement indicator by a cable or a rod that can also serve to open and close a passage through the piston. When the passage through the piston is closed, the piston moves through the conduit in synchronism with fluid flow. A stop, located at the downstream end of the conduit, is adapted to open the passage as the piston engages it. Variations in the cross sectional area enclosed by the conduit are compensated for by a spatially distributed correcting device. An envelope communicating with only one side of the piston surrounds the conduit. In an embodiment without the mechanical coupling to the piston, a venturi formed in the main channel of an operative system is used to provide the pressure difference to return the piston located in a by-pass channel to its upstream end position after a test run.

CROSS REFERENCES TO RELATED APPLICATIONS

This is a continuation-in-part of a copending application, Ser. No. 653,089, filed July 13, 1967, and now abandoned.

BACKGROUND OF THE INVENTION

This invention relates to the measurement of fluid flow and, more particularly, to the determination of the flow characteristics of flowmeters.

In order to measure the volume of fluid passing through a flowmeter with accuracy, the characteristic of the flowmeter should first be determined with respect to the particular fluid to be used at different flow rates within the range of contemplated operation. In the case of a turbine type flowmeter that develops electrical oscillations proportional in number to the volume of flow through the flowmeter, this characteristic would be expressed in terms of the number of pulses generated by the flowmeter per unit volume of fluid passing through the flowmeter.

In general, the techniques for determining the characteristic of a flowmeter have not kept pace with the developments in flowmeters themselves. Thus, even though presently available flowmeters possess an extremely fast response time to fluid flow, the techniques for determining the characteristics of such flowmeters require a great deal of test fluid to pass through the flowmeter to obtain reasonable accuracy. Considerable expense is involved in providing storage tanks, pumps, and fluid measuring equipment having the capacity to accommodate a large volume of test fluid. The expense rises even more if the particular fluid with which the flowmeter is to be used is a hard-to-manage fluid, such as liquid hydrogen.

In view of the cost considerations, compromises are often made in determining the characteristic of the flowmeter. Sometimes the flowmeter is only tested for rates of flow at the lower end of the operational range, and other times an easy-to-manage fluid is substituted as the test fluid for the particular fluid to be used in actual operation.

Needless to say, these compromises impair an accurate determination of the flowmeter characteristic under operating conditions.

My patent 3,403,544, which was issued on Oct. 1, 1968 and assigned to the assignee of the present application, discloses a technique for accurately determining the characteristic of a flowmeter with a small amount of test fluid. Specifically, a piston is designed to move within a conduit as a fluid barrier in synchronism with the fluid flow through the conduit. The flowmeter under test is connected in series with the conduit so the linear displacement of the piston accurately represents the volume of fluid passing through the flowmeter. The piston carries a magnet with it, and the piston displacement is sensed by pickoff elements, such as Hall generators, distributed at discrete intervals along the length of the conduit.

Although the piston techniques as described in the previous paragraph greatly reduces the quantity of test fluid required to determine accurately the characteristic of a flowmeter, the resolution of the determination is dependent on the interval between the pickoff elements. The cost of the pickoff elements and the space they occupy impose a practical lower limit on their spacing along the length of the conduit.

The volume of fluid passing through the flowmeter under test equals the product of the cross sectional area of the inside of the conduit and the displacement of the piston. To facilitate the handling of the test data, it is desirable to displace a constant volume of fluid per unit linear displacement of the piston over the entire length of the travel of the piston. Further, it is also desirable that this constant volume be precisely some dimensionally convenient standard value, for example 0.01 gallon per inch.

The piston is displaced in the course of a test run by establishing a high pressure on the upstream side of the piston, which tends to deform the conduit, making it bulge slightly. Therefore, the cross sectional area of the inside of the conduit changes somewhat and the test data must be corrected accordingly.

Some special problems are involved in the use of the piston technique as a prover, i.e., to determine the flow characteristic of a flowmeter while it is connected in an operative system. It is difficult to set the piston into motion at the beginning of a test run and to stop the piston at the end of the test run without introducing large disturbances into the fluid system, which may in turn adversely affect the measurement. A related problem is the return of the piston to its upstream end position after each test run. In prior art apparatus, the conduit through which the piston travels, is typically not connected in line with the main flow channel of the fluid system, but is switched into the system at the time of a test run by an intricate arrangement of by-pass and check valves. Examples of such apparatus are disclosed in Pfrehm Patent 3,021,703, issued Feb. 20, 1962, and Halpine et al. Patent 3,295,357, issued Jan. 3, 1967.

SUMMARY OF THE INVENTION

According to one aspect of the invention, a mechanical connection couples the piston to a stationary member in apparatus of the above-described type for determining the flow characteristics of a flowmeter. By coupling the mechanical connection to a displacement indicator, a continuous representation of the displacement of the piston is provided as the piston moves through the conduit. A continuous representation of piston displacement is needed to achieve a precise measurement in a system having a low flow rate. The mechanical connection comprises a cable and a drum onto which the cable is wound. As the piston moves downstream during a test run, the cable is unwound from the drum.

In another aspect of the invention, the piston is provided with a passage through which fluid flow may take place from one side of the piston to the other and a controllable plug that is capable of blocking and unblocking the passage. Thus, the piston can be permanently placed in line with the main channel of an operative fluid system in the path of fluid flow. During normal operation of the fluid system, the piston is held at its upstream end position and the plug is controlled so the passage remains unblocked. To set the piston in motion, the passage is blocked by the plug and the piston is released. As a result, the blocked piston forms a fluid barrier so the piston is forced through the conduit in synchronism with fluid flow. At the downstream end of the conduit, a stop is provided that is adapted to control the plug as the piston approaches the downstream end, gradually unblocking the passage through the piston. The plug is held in the unblocked position while the piston is returned to its upstream end position, thereby permitting normal operation of the fluid system to take place during this time.

As a feature of the invention, the mechanical connection couples the plug to a releasable restraining device that controls the plug. On the release of the restraining device, the plug blocks the passage through the piston. Upon the engagement of the restraining device, the plug unblocks the passage. The restraining device is preferably a clutch controlled motor that also returns the piston to the upstream end of the conduit.

According to another aspect of the invention, a spatially distributed correcting device is provided to compensate for the unavoidable variations in the cross sectional area enclosed by the conduit through which the piston travels from a standard value. A parameter of the correcting device, which can be controlled to a high degree of accuracy, varies as function of the position of the piston in correspondence with the variations in the cross sectional area of the conduit.

Another aspect of the invention is the utilization of the venturi phenomenon to return the piston to its upstream end position after a test run. In this case, the conduit through which the piston travels is located in a by-pass channel in series with the main flow channel of an operational fluid system. A single three-way valve is situated at the upstream junction of the main channel and the by-pass channel, and the downstream junction is open. The main channel has a portion in which a venturi is formed. A fluid line with a normally closed valve connects the venturi with the upstream end of the conduit. The piston is returned to the upstream position by placing the three-way valve so fluid flow takes place straight through the main channel and by opening the valve in the fluid line. As a result of the low static pressure produced at the venturi, the piston is driven to the upstream end of the conduit.

In another aspect of the invention, an envelope encloses the conduit. The envelope communicates with a portion of the conduit on one side of the piston only, preferably the upstream side. Thus, the pressure on the inside and outside of the conduit is substantially equalized as the piston is driven through the conduit.

BRIEF DESCRIPTION OF THE DRAWINGS

The features of specific embodiments of the best mode contemplated for carrying out the invention are illustrated in the drawings, in which:

FIG. 1 is a schematic diagram of a test setup for determining the characteristic of a flowmeter according to the invention;

FIG. 2 is a side elevation view partially in section of apparatus incorporating the principles of the invention;

FIG. 3 is a schematic diagram of the indicator employed in the apparatus of FIGS. 2 and 4;

FIG. 4 is a side elevation view partially in section of other apparatus incorporating the principles of the invention;

FIG. 5 is a side elevation view partially in section of an alternative embodiment of the apparatus in FIG. 4; and FIGS. 6A and 6B, respectively, are a side elevation and a top section view of the cable and drum of FIG. 4, illustrating the technique for winding the cable on the drum.

DESCRIPTION OF SPECIFIC EMBODIMENTS

In FIG. 1 a test setup for determining the characteristic of a flowmeter 1 is shown. For the purpose of discussion, flowmeter 1 is assumed to be a turbine type flowmeter that generates as a digital indication electrical oscillations proportional in number to the volume of fluid passing through the flowmeter. A lead 2 provides an electrical connection for the digital indication from flowmeter 1 to an indicator 3. A piston-conduit assembly 4 is connected in series with flowmeter 1 by a pipe 5. Connecting flanges 6 and 7 secure the joint between assembly 4 and pipe 5. The piston, which forms a fluid barrier within the conduit of assembly 4, is mechanically coupled to indicator 3 by a linkage 8. Flowmeter 1 is connected by pipe 12 to a surge tank 13. A valve 14 controls the flow of test fluid through pipe 12. Gas under pressure from a source 9 is introduced through a valve 10 into an inlet 11 of assembly 4 and occupies the space within assembly 4 on the opposite side of the piston barrier from flowmeter 1. The space on the other side of the piston barrier is completely occupied by the test fluid up to some level in surge tank 13.

In operation, valve 10 is initially closed, valve 14 is initially open, and the piston is located at its upstream stop position. Then valve 10 is opened to introduce gas from source 9 into assembly 4. The pressure of the gas forces the piston downstream. As the piston moves downstream, the volume of test fluid in the conduit displaced by the piston equals the product of the cross sectional area of the conduit and the linear displacement of the piston. This linear piston displacement is mechanically coupled to indicator 3. Since flowmeter 1 is connected in series with assembly 4, the same volume of fluid passes through it in a given interval of time as is displaced by the piston. Consequently, the characteristic of flowmeter 1 is derivable by indicator 3 from the information conveyed to it by lead 2 and linkage 8. As the test fluid is displaced by the piston, it flows into surge tank 13 raising the fluid level therein. To stop the piston, valve 14 is closed. This prevents further flow of test fluid into surge tank 13. The piston can be started and stopped numerous times under the control of valve 14 as it moves downstream, the exact number of times depending upon the flow rate, the length of the conduit, and the desired accuracy. Each time the piston is started and stopped as it moves downstream, a new set of test data is transmitted to indicator 3 for evaluation. After the piston reaches its downstream stop position, it is recycled, that is, returned to its upstream stop position. Valve 10 is closed and the gas is evacuated from the upstream side of the piston by means not shown in FIG. 1. Then valve 14 is opened and the test fluid in surge tank 13 pushes the piston back to its upstream stop position.

In FIG. 2, the construction of the piston-conduit assembly and linkage 8 are shown in detail. A conduit 20 has a honed inside surface defining a cylindrical volume with a round cross-section through which a piston 21 moves. Only the upstream and downstream ends of conduit 20 are actually shown in FIG. 2. In practice, conduit 20 could be as long as desired. Annular seals 22 around the periphery of piston 21 prevents the passage of fluid from one side of piston 21 to the other. A ring 19 of low-friction material such as glass-filled Teflon provides a bearing surface between piston 21 and the inner surface of conduit 20. Piston 21 functions as a fluid barrier as it moves through conduit 20. Piston 21 is mounted on a hollow rod 23 where it is held in place between the threaded end portion 24 of rod 23 and a retaining ring 25. A nose 26 is threadably mounted on the end portion of rod 23 so it protrudes from the surface of piston 21. In FIG. 2, piston 21 is shown resting against an upstream piston stop 27. Rod 23 extends through the center of piston stop 27. Sealing rings 28 and 29 located in annular recesses of stop 27 prevent leakage of fluid from assembly 4 between stop 27 and rod 23. An envelope 30 surrounds conduit 20 and is welded at one end to connecting flange 7. Stop 27 extends through an opening in the other end of envelope 30 and is welded there to the suface of envelope 30. A support 31 maintains the position of conduit 20 and envelope 30 near upstream piston stop 27. Envelope 30 communicates with the portion of conduit 20 on the upstream side of piston 21 through a plurality of openings 32 distributed around support 31. A downstream piston stop 33 has a recess 34 into which nose 26 fits as piston 21 approaches the downstream end of conduit 20. Downstream stop 33 has an outer flange portion that is clamped between connecting flanges 6 and 7. The downstream end of conduit 20 fits between connecting flange 7 and downstream stop 33. Conduit 20 is attached to downstream stop 33 by a connecting screw 37. A sealing ring 35 in an annular groove in the surface of downstream stop 33 prevents leakage of the test fluid out of conduit 20, and a sealing ring 36 in an annular groove in connecting flange 7 prevents leakage of fluid out of envelope 30. A solid rod 41 that extends along the length of conduit 20 in axial alignment therewith is supported by a disc 42 mounted in a recess in downstream stop 33. Disc 42 has circumferentially distributed openings 43 for the passage of test fluid from conduit 20 and a center opening through which rod 41 passes. Rod 41 is secured to disc 42 so it cannot move in the axial direction. Pipe 12 (FIG. 1) has a flange on one end that fits in another recess in downstream stop 33. The flange of pipe 12 and disc 42 are held in place by connecting flange 6. A sealing ring 44 in an annular groove in downstream stop 33 prevents leakage of test fluid out of assembly 4. Sealing rings 45 and 46 in annular grooves in the interior of nose 26 prevents leakage of fluid between nose 26 and rod 41. Rods 23 and 41 lend mutual support to one another through a sleeve 47 interposed between the outer surface of rod 41 and the inner surface of rod 23. As a result, although rod 41 is directly supported only at the downstream end of assembly 4 and rod 23 is directly supported only at the upstream end of assembly 4, rods 41 and 23 are maintained in axial alignment with conduit 20 along their entire lengths by the mutual support through sleeve 47.

Rod 41 is fabricated with a variable diameter and cross sectional shape to compensate for the variations in diameter and cross sectional shape of the area enclosed by conduit 20. In this way, the volume of fluid displaced by piston 21 per unit linear displacement of piston 21 can be maintained constant at a numerically convenient standard value, such as 0.01 gallon per inch, to a high degree of accuracy. A given percentage variation in the inside diameter of conduit 20 is compensated for by a much larger percentage variation in the outside diameter of rod 41. For example, if the inside diameter of conduit 20 is nominally six inches and the outside diameter of rod 41 is nominally one-half inch, a variation of 0.002 inch in the inside diameter of conduit 20 can be compensated for with a variation of 0.024 inch of the rod. Because of this fact and the fact that it is easier in the course of fabrication to control the variations in the outside surface of rod 41 than the inside surface of conduit 20, the volume displaced per unit linear displacement of piston 21 can be made very precise over the entire length of linear piston displacement by utilizing rod 41.

The gas under pressure enters assembly 4 from source 9 (FIG. 1) through inlet 11. The gas exerts a force on the upstream side of piston 21, thereby pushing it downstream through conduit 20 and displacing the test fluid in conduit 20. The test fluid occupies the space on the dwonstream side of piston 21. The pressurized gas occupies the space on the upstream side of piston 21 and also the space in envelope 30 between it and conduit 20. Accordingly, the pressure on the opposite sides of conduit 20 is approximately equalized so its walls are not appreciably deformed by the pressurized gas. In summary, envelope 30, being in communication with the portion of conduit 20 on the upstream side of piston 21, preserves the precise volume of fluid displacement per unit linear displacement of piston 21 established in the course of the fabrication of conduit 20 and rod 41.

In addition to hollow rod 23, linkage 8 includes a rod 50 attached to rod 23 by a cross member 51. Rod 50 has a longitudinal groove into which a toothed rack 52 fits. The teeth of rack 52 engage the teeth of a spur gear 53 mounted on a rotatable shaft 54. Rods 23 and 50 are supported by split linear bearings 55, 56, and 57. Linear bearings 55 and 56 are attached to a cross member 58, and linear bearing 57 is attached to a cross member 59. Cross member 59 is fastened to the end of upstream stop 27 by a bolt 60. Cross members 58 and 59, which are stationary relative to assembly 4, serve to maintain rods 23 and 50 in predetermined, spaced-apart, parallel relationship to one another. In essence, rods 23 and 50, being fastened together by connecting member 51, move as a single folded rod. Therefore, the space occupied by linkage 8 is shorter in length than would otherwise be the case. As piston 21 moves downstream through conduit 20, rods 23 and 50 move from right to left as viewed in FIG. 2. As rack 52 moves with rod 50, it turns gear 53 and shaft 54. In short, the linear displacement of piston 21 is converted into a rotational displacement of shaft 54. Shaft 54, in turn, drives indicator 3 (FIG. 1).

In FIG. 3 a schematic block diagram of indicator 3 is shown together with an end view of its connection with linkage 8. A spur gear 70 is mounted on rotatable shaft 54. The rotation of spur gear 53 responsive to the linear displacement of rack 52 is transferred by shaft 54 to spur gear 70. The teeth of spur gear 70 engage the teeth of a spur gear 71. Spur gear 71 is coupled by a shaft 73 to a shaft rotation digitizer 72. Digitizer 72 is a commercially available piece of equipment that produces a pulse each time shaft 73 is rotationally displaced a predetermined amount. The exact number of pulses produced per unit volume of fluid displacement in conduit 20 depends upon the characteristics of digitizer 72 and the gear ratio of rack 52 and gears 53, 70, and 71. Generally speaking, digitizer 72 would be adapted to produce many more pulses for a given volume of fluid displacement than flowmeter 1 produces for the same volume of fluid passage through it. This improves the resolution of the apparatus.

The characteristics of flowmeter 1 is determined by counting the pulses generated by digitizer 72 in the interval between two or more pulses generated by flowmeter 1. The circuitry shown in block form in FIG. 3 accomplishes this. A start signal is generated at the same time that the piston motion is started. The start signal is applied through a delay network 74 to one input of an AND circuit 75. Network 74 delays the application of the start signal to AND circuit 75 for a sufficient duration of time to enable the flow rate of the test fluid to stabilize. This time delay is very small since the stabilized condition becomes established after piston 21 travels a very short distance. The first pulse generated by flowmeter 1 after application of the start signal to AND circuit 75 is gated through AND circuit 75 and transmitted through a frequency divider 76 to a flip-flop 77. This pulse triggers flip-flop 77 into a change in state. As a result, the output of flip-flop 77, which is coupled to the input of an AND circuit 78, becomes energized. Thereafter, the pulses generated by digitizer 72 are gated through AND circuit 78 to a pulse counter 79. Pulse counter 79 registers the number of pulses generated by digitizer 72 until the occurrence of another pulse generated by flowmeter 1, which triggers flip-flop 77 to de-energize its output lead. The number of pulses of flowmeter 1 between which the pulses generaged by digitizer 72 are registered by counter 79 is determined by the division factor of frequency divider 76. For example, if the division factor is 1, succeeding pulses generated by flowmeter 1 mark the beginning and the ending of the count of the pulses generated by digitizer 72. If, on the other hand, the division factor of frequency divider 76 is 100, the number of pulses generated by digitizer 72 during the interval of 100 pulses generated by flowmeter 1 are counted. In the latter case, after the start signal is applied to AND circuit 75, the first pulse generated by flowmeter 1 is coupled through frequency divider 76 to energize flip-flop 77, the next 99 pulses advance the state of frequency divider 76, and the 100th pulse is coupled to flip-flop 77 to trigger it back into its original state. After the test run is completed, frequency divider 76, flip-flop 77, and pulse counter 79 are reset in preparation for another test run.

By proper selection of the system parameters, pulse counter 79 can be made to reflect directly the reciprocal of the flowmeter characteristic. By digitally displaying the state of pulse counter 79, therefore, a number can be read that need only be multiplied times the number of pulses actually generated by the flowmeter in the course of operation to obtain the corrected actual volume of fluid passing through the flowmeter. A concrete example is now considered to illustrate the ease of evaluating the test data. The displaceable volume of test fluid in conduit 20 is precisely two gallons and shaft digitizer 72 generates 200,000 pulses as piston 21 moves from upstream stop 27 to downstream stop 33. Counter 79 has a 10-decimal-digit capacity with a decimal point after the second digit from the left. Rod 41 is fabricated to compensate for irregularities in the cross section of conduit 20 so that the volume of test fluid displaced per unit linear displacement of piston 21 is constant throughout the distance of travel of piston 21. Further, flowmeter 1 generates approximately 1500 pulses per gallon of fluid passing through it. If the division factor of frequency divider 76 is set for 1,000 pulses, and in this time interval pulse counter 79 registers 60,000 pulses, this number would be displayed as follows: 00.00060000 gallon per flowmeter pulse. This displayed number is the reciprocal of the flowmeter characteristic and need only be multiplied times the number of pulses actually generated by flowmeter 1 when it is in an operational environment to indicate the corrected volume of fluid flowing through it.

Although the invention is described in connection with a flowmeter giving a digital indication, it could also be employed with a flowmeter giving an analog indication, for example, an indication on a dial. In such case, the flowmeter and the apparatus for determining the characteristic of a flowmeter are connected in series basically in the environment of a prover. First, a steady flow is established through a by-pass passage so the flowmeter gives an indication of the desired nominal flow rate at which the flowmeter characteristic is to be determined. Then the piston is released and the bypass passage is simultaneously closed to start movement of the piston therethrough. A source of clock pulses is substituted for flowmeter 1 in FIG. 3. The number of pulses generated by digitizer 72 within a predetermined fixed time interval, determined by the period of the clock pulses, is registered by counter 79. The fixed time interval between clock pulses is most conveniently selected to correspond to the unit of time employed such as one second or one minute. This technique could be employed with a flowmeter such as a rotometer for measuring the flow of compressible fluid.

The invention can also be employed to prove or verify flowmeter characteristics while the flowmeter is in actual use in an operational fluid system, as disclosed in the embodiments of FIGS. 4 and 5. In FIG. 4, conduits 85 and 86 house the proving apparatus. They are connected in series with conduits 87 and 88 of an operational fluid system in line with the main stream of fluid flow, which, as indicated by the arrows, moves from left to right in FIG. 4. The system also includes a flowmeter (not shown) to measure the fluid flow through the system. A piston 89 is adapted to travel within conduit 86 between an upstream end position at an annular stop 90, and a downstream end position at a cylindrical stop 91. Stop 90 is clamped between the adjoining end flanges of conduits 85 and 86. Stop 91 has an annular flange 92 that is clamped between the adjoining end flanges of conduits 86 and 88 and a circular end portion 93 with a plurality of peripherally located openings 94 and a centrally located recess 95. A plurality of pick-off elements 96 of conventional design are mounted at spaced apart intervals on the outside of conduit 86 to sense piston 89 as it travels.

Piston 89 comprises a cylindrical rear portion 100, an annular front portion 101, and a plug 102. A sleeve 103 and a ring holder 104 surround front portion 101. Piston support rings 105 and a sealing ring 106 are embedded in the outer surface of holder 104. Rings 105, which serve to support and maintain piston 89 in axial alignment with conduit 86 as it travels therethrough, are preferably made from a low friction material such as Teflon. Ring 106, which serves to seal the annular space between the outer surface of piston 89 and the inner surface of conduit 86, is a piston seal of conventional design whose outer periphery is urged downstream by fluid pressure or by a spring to wedge against the inner surface of conduit 86. Portion 100, portion 101, sleeve 103, holder 104, rings 105, and ring 106 are all attached to one another to form an integral structure. Portion 100 has a plurality of peripherally located openings 114 through it. The outer surface of portion 100 and the inner surface of portion 101, together with openings 114, define an annular passage through piston 89. A rod 107 is secured to plug 102 by a threaded connection and extends through the center of rear portion 100 to the upstream end of piston 89. Rod 107 is capable of sliding axially through rear portion 100, thereby also moving plug 102 axially relative to portion 100. A tension spring 108 is retained between the center of rear portion 100 and plug 102 by extensions 109 and 110 at the adjacent ends of portion 100 and plug 102, respectively. Spring 108 normally urges plug 102 away from portion 100 in a downstream direction toward portion 101. Plug 102 has a pintle-shaped nose 111 and a convexly tapered base 12. The downstream end of portion 101 has a concavely tapered lip 113 that fits with base 112 when plug 102 is pushed against portion 101. Plug 102 is preferably made from a soft metal so a good seal can be established between base 112 and lip 113. One end of a cable 120 is secured to the upstream end of rod 107. The other end of cable 120 is secured to a drum 121 onto which cable 120 is wound. Drum 121 is mounted on a shaft 122 in conduit 85, i.e., at the upstream end of conduit 86. Shaft 122, which is supported for rotation relative to conduit 85 by journal bearings 123 and 124, extends outside of conduit 85 where it is coupled by a clutch 125 to a motor 126. When motor 126 is energized, it rotates in the direction that winds cable 120 onto drum 121, as depicted by the arrow in FIG. 4. When motor 126 is not energized, it is locked against rotation, thus functioning as a brake. Cable 120 is held taut at all times by the fluid pressure.

During normal operation of the fluid system of FIG. 4, clutch 125 is engaged. Motor 126 is not energized so drum 121 is prevented from rotating. Cable 120, acting through rod 107, holds plug 102 away from member 101 in opposition to spring 108, as illustrated in FIG. 4. Thus, the annular passage through piston 89 is unblocked by plug 102 so fluid is able to flow from conduit 87 through piston 89 to conduit 88.

To initiate a test run of piston 89 through conduit 86, clutch 125 is simply released so shaft 122 is no longer prevented from rotating by motor 126. As a result, spring 108 and to some extent the fluid pressure push base 112 of plug 102 against lip 113 of portion 101 to block the annular passage through piston 89. While the annular passage is being blocked, piston 89 is set into motion. By the time the annular passage is completely blocked by plug 102, piston 89 is traveling through conduit 86 in synchronism with the flow of fluid in the system. As piston 89 travels through conduit 86 under the force of the fluid flowing in the system, cable 120 is unwound from drum 121. When piston 89 reaches stop 91, nose 111 enters recess 95 and traps fluid therein to cushion the impact. Nose 111 is longer than the depth of recess 95 so the end of nose 111 bottoms against the end of recess 95 while the downstream end of portion 101 is spaced from end portion 93 by an amount greater than the axial distance of travel of plug 102 relative to portion 101 between the blocked and unblocked positions of the annular passage. After the downstream movement of plug 102 is stopped by recess 95, the fluid pressure in the system continues to force downstream the remainder of piston 89, including portions 100 and 101. Consequently, spring 108 is compressed and the annular passage through piston 89 is unblocked so the fluid flow through piston 89 is reestablished. By blocking and unblocking the annular passage in the described manner, the piston is set into motion at its upstream end position and stopped at its downstream end position without introducing appreciable disturbances into the fluid system.

To return piston 89 to its upstream end position in preparation for another test run, clutch 125 is engaged and motor 126 is energized to drive shaft 122. Thus, cable 120 is wound onto drum 121, pulling piston 89 upstream with it. While cable 120 is being wound back onto drum 121, motor 126 pulls against spring 108 so it remains compressed and the annular passage through piston 89 remains unblocked. Therefore, fluid flow takes place through piston 89 as it is being returned to its upstream end position. The spring constant of spring 108 is selected so it is sufficiently large to insure a positive blocking action of the annular passage at the beginning of the test run on the release of clutch 125, and small enough to enable motor 126 to compress spring 108 enough to unblock completely the annular passage while piston 89 is being returned.

Cable 120, drum 121, and shaft 122 can serve as the mechanical connection between piston 89 and a displacement indicator in the same manner as linkage 8 in FIG. 2. In such case, pick-off elements 96 are not used. A cable and drum consume much less space than linkage 8 so it is practical to house the mechanical connection completely within the confines of the conduits through which the fluid in the system flows. A bevel gear 130 is mounted on shaft 122. A bevel gear 131, which engages bevel gear 130, is mounted on shaft 73. Shaft 73 is the input to shaft rotation digitizer 72 in FIG. 3. Thus, the arrangement disclosed in FIG. 3 serves as the displacement indicator for piston 89, which is coupled thereto by the described mechanical connection.

When cable 120, drum 121, and shaft 122 function as the mechanical connection it is important that the rate at which cable 120 is paid out by drum 121 remains constant as a function of the displacement of piston 89 over the entire length of conduit 86. Otherwise, the angular displacement of shaft 122 would not be directly proportional to the longitudinal displacement of piston 89. This direct proportionality is maintained by holding the angle that cable 120 forms with a line parallel to the axis of rotation of drum 121 of conduit 86 constant at all times.

Reference is made to FIG. 6A, in which dashed line 132 represents a longitudinal path through conduit 86 and piston 89 is represented schematically. The axis of rotation of drum 121 is perpendicular to line 132. A continuous spiral groove 127 is cut in the outer surface of drum 121. The portion of cable 120 wound around drum 121 lies in groove 127, which insures that cable 120 is wound onto drum 121 in the same manner every time without any overlapping turns. When piston 89 is at the upstream end of conduit 86, the end of cable 120 attached to rod 107 is located at point E in FIG. 6A, and cable 120 leaves the outer surface of drum 121 at point C, assuming that cable 120 has negligible thickness. The point of intersection of line 132 and the outer surface of drum 121 is located at point D. When piston 89 is at the middle of conduit 86, the end of cable 120 attached to rod 107 is located at point F, and cable 120 leaves the outer surface of drum 121 at point B. When piston 89 is at the downstream end of conduit 86, the end of cable 120 attached to rod 107 is located at point G, and cable 120 leaves the outer surface of drum 121 at point A. A dashed line 133 represents an imaginary line on the surface of drum 121 that passes through points A, B, C, and D. Line 132 passes through points D, E, F, and G, i.e., it is the locus of the point of connection of cable 120 to rod 107 as piston 89 moves through conduit 86.

When the angle formed by cable 120 with line 132 is the same at points E, F, and G, the right triangles defined by points CDE, BDF, and ADG are similar in a geometric sense. Since the sides of similar triangles are directly proportional to one another, the desired direct proportionality between the displacement of piston 89 and the amount of cable 120 paid out from drum 121 is, therefore, established by making the angle that cable 120 forms with line 132 the same along the entire length of conduit 86. This is achieved by making a prescribed initial adjustment of the axial position of drum 121 on shaft 122, i.e., in the direction of arrow 134, preferably at the time the apparatus is assembled. Specifically, the axial position of drum 121 is initially adjusted to meet the following criterion: If piston 89 were to be drawn all the way back to drum 121 by rotating shaft 122, the end of cable 120 attached to rod 107 would cross line 133 at point D. In fact, it is not physically possible to draw piston 89 all the way back to drum 121 because of the space that piston 89 occupies. However, the point at which the end of cable 120 would cross line 133 can be determined by projection for any axial position of drum 121. It is to be noted that the pitch of groove 127 plays no part in the criterion.

Cable 120 and/or drum 121 can also be employed to compensate for variations in the cross sectional area enclosed by conduit 86 in the same manner as rod 41 in FIG. 2. Specifically, the depth of groove 127 varies as it spirals around drum 121 so that the radius of curvature of cable 120 wound on drum 121 also varies, as depicted in FIG. 6B. Thus, the amount of cable 120 paid out per unit angular displacement of shaft 122 also varies slightly. As a result, errors that would otherwise occur in the reading of the displacement indicator due to the unavoidable variations in the cross sectional area enclosed by conduit 86 are corrected. In summary, the compensation is achieved by introducing slight deviations from the direct proportionality between the angular displacement of shaft 122 and the longitudinal displacement of piston 89 in the course of travel of piston 89 through conduit 86. Instead of varying the depth of groove 127, or in addition thereto, the thickness of cable 120 could be varied along its length to effect the compensation. In either case, the radius of curvature of the longitudinal axis of cable 120 wound on drum 121 is varied in correspondence to the variations in the cross sectional area enclosed by conduit 86 to hold the rate at which cable 120 is paid out by drum 121 constant as a function of the displacement of fluid volume by piston 89.

The mechanical connection to piston 89 in FIG. 4 provided by cable 120, drum 121, and shaft 122 is capable of performing four separate functions. First, it can control the position of plug 102, thereby setting piston 89 in motion. Second, it can return piston 89 to its upstream end position after a test run. Third, it can connect piston 89 mechanically to a displacement indicator so as to provide a continuous indication of the position of piston 89. Fourth, it can compensate for the variations in cross sectional area enclosed by conduit 86.

The mechanical connection of FIG. 4 could, of course, be substituted for linkage 8 in FIG. 2, and vice versa.

In place of a direct connection to plug 102, such as cable 120 in FIG. 4, plug 102 could be indirectly controlled by a magnetically actuated solenoid. Moreover, if a piston is located in a conduit that is not in line with the main channel of the fluid system, being instead in a by-pass channel switched into the system by a control valve when a test run is to be initiated, nothing is required to control the plug of the piston. In such a case, the spring holds the plug in its blocking position at all times except when the piston is at the downstream stop at which time the stop and the fluid pressure force the plug against the force of the spring into its unblocked position. In both these arrangements the piston would be, so to speak, free because there would be no mechanical connection to it.

In FIG. 5, a prover is shown that involves a free piston and an arrangement for returning it to its upstream position after a test run. A three-way valve 140, a conduit 141 having a portion 142 that forms a venturi, and a T-section 143 are connected in series with a pipe 145 and a pipe 146 in line with the main stream of a fluid system. An end plate 144 terminates one branch of valve 140. The ends of a by-pass conduit 147 are connected by an elbow 148 to valve 140 and by an elbow 149 to T-section 143. A free piston 150, which is basically the same as piston 89 in FIG. 4 except that its plug is uncontrolled, is adapted to move through conduit 147 to a downstream stop 151. A fluid line 153, having a normally closed valve 154, connects venturi portion 142 to elbow 148. During the normal operation of this system, valve 140 is in the straight-through position represented in FIG. 5 and valve 154 is closed. Pick-off devices 152 sense piston 150 as it travels through conduit 147. To initiate a test run, valve 140 is switched to the by-pass position. As a result, fluid flows through conduit 147, setting piston 150 in motion. When piston 150 reaches its downstream end position, stop 151 opens its plug so fluid flows through elbow 149 to pipe 146. After the test run, valve 140 is again switched to its initial straight-through position. To return piston 150 to its upstream end position, valve 154 is opened. A low static pressure forms at venturi portion 142 that draws fluid from conduit 147 upstream of piston 150 into conduit 141. Consequently, piston 150 is also drawn upstream until it reaches its upstream end position at which time valve 154 is closed again. In some systems, it would be advantageous to return piston 150 during low pressure periods. In such case, a pump 155 could be placed in series with line 153 in FIG. 1 to aid the action of venturi portion 142.

In the specific embodiments of the invention illustrated, the volume of fluid passing through a flowmeter under test is precisely measured. The features of the invention are, however, generally applicable to the measurement of volumetric fluid flow through a fluid system. For example, the volume of fluid passing through pipe 12 into surge tank 13 is of necessity also registered by indicator 13. Therefore, the volume of fluid dispensed by a nozzle into a mixing tank could be measured or controlled with great accuracy by utilizing the invention.

What is claimed is:

1. Apparatus for determining the volume of fluid flow through a fluid system comprising:
   a conduit for fluid flow, the conduit being adapted to communicate with the fluid system;
   a piston located within the conduit and adapted to travel through the conduit as a fluid barrier in synchronism with fluid flow through the fluid system;
   a rotatable drum located at the upstream end of the conduit;
   a cord fastened at a first end to the piston and at a second end to the rotatable drum, the cord being wound and unwound from the drum as the piston travels through the conduit; and
   means for indicating the angular displacement of the drum.

2. The apparatus of claim 1, in which the angular indicating means produces a number of pulses proportional to the displacement of the drum.

3. The apparatus of claim 2 for determining the flow characteristics of a digital flowmeter connected in the fluid system, in which a counter is provided that begins to count the pulses produced by the indicatinng means responsive to one pulse generated by the flowmeter under test and stops counting the pulses produced by the indicating means responsive to a subsequent pulse produced by the flowmeter under test.

4. The apparatus of claim 1, in which the radius of curvature of the longitudinal axis of the cable wrapped on the drum varies so as to compensate for variations in the cross sectional area enclosed by the conduit.

5. The apparatus of claim 1, in which a spiral groove is formed in the outer surface of the drum, the cable wound on the drum lies in the groove, and the drum is so positioned axially that if the piston were drawn up to the drum, the first end of the cable would coincide with the point of intersection of the imaginary line defined by the first end of the cable as the piston travels and the imaginary line defined by the points at which the cable leaves the drum as it is unwound.

6. The apparatus of claim 1, in which a motor is provided that is connectable to the rotatable drum to pull the piston through the conduit in the direction opposite the fluid flow so as to return the piston to its upstream end position at the end of a test run.

7. The apparatus of claim 1, in which the rotatable drum is releasably restrained, the piston has a passage through it providing a path for fluid flow from one side of the piston to the other and means for blocking the passage upon the release of the rotatable drum, and the piston travels through the conduit in synchronism with fluid flow when the passage is blocked.

8. The apparatus of claim 1, in which means correct for variations in the cross sectional area enclosed by the conduit along its length such that the displacement indicating means accurately represents the volume of the conduit on one side of the piston as the piston travels through the conduit.

9. The apparatus of claim 1, in which an envelope encloses the conduit and the interior of the envelope communicates with the interior of the conduit on only one side of the piston to equalize substantially the pressure on opposite sides of the conduit.

10. Apparatus for measuring fluid flow comprising:
    a conduit through which fluid flows from an upstream position to a downstream position;
    a movable member located within the conduit;
    a passage through the member providing a path for fluid flow from the upstream position to the downstream position;
    releasable means for restraining the member at the upstream position of the conduit; and
    means for blocking the passage, the member being adapted to move through the conduit from the upstream position to the downstream position as a fluid barrier in synchronism with fluid flow when the passage is blocked.

11. The apparatus of claim 10, in which the blocking means blocks the passage through the member responsive to the release of the member by the restraining means.

12. The apparatus of claim 10, in which the passage is annular, the downstream end of the passage has a converging lip, the blocking means comprises a plug that is movable relative to the member in the direction of fluid flow, the plug has a base that is seated against the lip when the passage is blocked and an elongated nose protruding from the member in the downstream direction, a compression spring connects the plug to the member so as to urge the base of the plug against the lip of the passage, and the releasable restraining means is connected to the plug to hold the base of the plug away from the lip of the passage and to prevent the member from moving.

13. The apparatus of claim 12, in which the restraining means is a rotatable drum located upstream of the member and releasable means for locking the drum against rotation and the drum is connected to the member by a cable attached at one end to the drum and at the other end to the member, the cable being sufficiently long to enable the member to travel to the downstream position.

14. The apparatus of claim 13, in which the releasable locking means is a motor coupled to the drum by a clutch, the drum being locked against rotation by the motor when the clutch is engaged and being free to rotate when the clutch is released.

15. The apparatus of claim 12, in which a stop is located at the downstream end position of the conduit, the stop has an opening through it for the passage of fluid from the conduit, the base is located upstream of the lip, the stop is formed to contact the protruding nose of the plug without contacting the member as the member approaches the downstream end position so that the nose bottoms against the stop and unblocks the passage.

16. The apparatus of claim 15, in which the stop comprises a cylindrical insert in the conduit that has one end facing upstream, the one end has a recess into which the nose of the plug fits, and the opening through the stop is disposed on the periphery of the end.

17. The apparatus of claim 10, in which the passage has a sealing surface and the blocking means is a plug that is movable against the sealing surface to block the passage and away from the sealing surface to unblock the passage.

18. The apparatus of claim 17, in which the plug is located upstream of the sealing surface when the passage is unblocked and the restaining means restrains the member by holding the plug away from the sealing surface and releases the member by releasing the plug so it is able to move against the sealing surface to block the passage.

19. The apparatus of claim 17, in which the plug is biased against the sealing surface by a spring, and a stop is provided at the downstream end of the conduit that engages the plug without engaging the remainder of the member to unblock the plug as the member approaches the downstream end of the conduit.

20. The apparatus of claim 17, in which a mechanical connection couples the plug to the releasable restraining means, the restraining means holding the plug away from the sealing surface until released.

21. The apparatus of claim 20, in which the restraining means is a rotatable drum located upstream of the member and releasable means for locking the drum against rotation, and the mechanical connection is a cable attached at one end to the drum and at the other end to the plug, the cable being sufficiently long to enable the member to travel to the downstream end position.

22. The apparatus of claim 21, in which the releasable locking means is a motor coupled to the drum by a clutch, the drum being locked against rotation by the motor when the clutch is engaged and being free to rotate when the clutch is released.

23. Apparatus for determining the volume of fluid flow through a fluid system comprising:
a conduit for fluid flow, the conduit being adapted to communicate with the fluid system;
a piston located within the conduit and adapted to move through the conduit as a fluid barrier in synchronism with fluid flow through the system;
a rotatable drum located at the upstream end of the conduit; and
a cable attached at one end to the drum and at the other end to the piston so that the cable can be wound onto the drum.

24. Apparatus for determining the volume of fluid flow through a fluid system comprising:
a conduit for fluid flow, the conduit being adapted to communicate with the fluid system;
a piston located within the conduit and adapted to move through the conduit as a fluid barrier in synchronism with fluid flow through the system;
means for indicating the displacement of the piston in the conduit; and
means for correcting for the variations in the cross sectional area enclosed by the conduit along the conduit so the indicating means accurately represents the volume within the conduit on one side of the piston as the piston moves through the conduit.

25. The apparatus of claim 24, in which the correcting means is a rod extending along the length of the conduit, the cross sectional area of the rod varying in correspondence with the variations of the cross sectional area enclosed by the conduit.

26. The apparatus of claim 24, in which the correcting means is a rotatable drum located near one end of the conduit and a cable attached at one end to the drum and at the other end to the piston, the cable is wrapped on the drum, and the radius of curvature of the longitudinal axis of the cable wrapped on the drum varies in correspondence with the cross sectional area enclosed by the conduit.

27. The apparatus of claim 24, in which the correcting means modifies the indication of displacement according to the variation in cross sectional area as the piston travels through the conduit.

28. A fluid system comprising:
a main channel through which fluid flows;
a venturi formed in the main channel;
a by-pass channel connected in parallel with a portion of the main channel;
a conduit connected in series in the by-pass channel;
a piston located within the conduit and adapted to travel through the conduit as a fluid barrier in synchronism with fluid flow;
means for sensing the movement of the piston through the conduit;
switching means located at the upstream junction of the main channel and the by-pass channel for directing fluid alternatively to the main channel and the by-pass channel; and
a fluid line with a normally closed valve connected from the venturi to the by-pass channel at the upstream side of the conduit.

29. The system of claim 28, in which the fluid line has a pump to drive fluid from the upstream side of the piston to the main channel.

30. The system of claim 28, in which the piston has a passage through it with a sealing surface, a plug that is movable in a downstream direction against the sealing surface to block the passage and is movable away from the sealing surface in an upstream direction to unblock the passage, means for urging the plug against the sealing surface, and a nose on the plug that protrudes from the body of the piston in a downstream direction, and a stop is provided at a downstream end of the conduit, the stop has an opening through it for the passage of fluid and is adapted to contact the protruding nose of the plug without contacting the piston as the piston approaches the downstream end position so that the nose bottoms against the stop and unblocks the passage.

31. The apparatus of claim 23, in which the drum is axially positioned so the angle that the cable leaving the drum forms with a line parallel to the axis of rotation of the drum remains constant as the piston moves through the conduit.

32. Apparatus for determining the volume of fluid flow through a fluid system comrising:
- a conduit through which fluid flows from an upstream position to a downstream position;
- a movable member located within the conduit and adapted to move through the conduit as a fluid barrier in synchronism with fluid flow through the system;
- a passage through the member providing a path for fluid flow from the upstream position to the downstream position, the passage having a sealing surface;
- a plug that is movable against the sealing surface in a downstream direction to block the pasage and away from the sealing surface in an upstream direction to unblock the passage; and
- a stop at the downstream end of the conduit that engages the plug without engaging the remainder of the member to unblock the passage as the member approaches the downstream end of the conduit.

33. The apparatus of claim 32, in which a spring is provided that urges the plug against the sealing surface of the passage.

References Cited

UNITED STATES PATENTS

| | | | |
|---|---|---|---|
| 2,792,705 | 5/1957 | Barrett | 73—3 |
| 2,892,346 | 6/1959 | Sargent | 73—239 |
| 2,934,938 | 5/1960 | Rhodes | 73—239 |
| 3,021,703 | 2/1962 | Pfrehm | 73—3 |
| 3,187,551 | 6/1965 | Hill | 73—3 |
| 3,254,523 | 6/1966 | Fisher et al. | 73—3 |
| 3,273,375 | 9/1966 | Howe | 73—3 |
| 3,324,707 | 6/1967 | Charbonnier | 73—3 |
| 3,270,549 | 9/1966 | Martin | 73—3 |
| 3,391,569 | 7/1968 | Rieke et al. | 73—3 |

S. CLEMENT SWISHER, Primary Examiner

PO-1050
(5/69)

UNITED STATES PATENT OFFICE
CERTIFICATE OF CORRECTION

Patent No. 3,492,856      Dated February 3, 1970

Inventor(s) Edward E. Francisco, Jr.

It is certified that error appears in the above-identified patent and that said Letters Patent are hereby corrected as shown below:

In the specification: column 4, line 71, "prevents" should be --prevent--. Column 6, line 4, "dwonstream" should be --downstream--; line 56, "characteristics" should be --characteristic--.

In the claims: claim 2, column 12, line 12, "angular" should be deleted, line 14, after "the", first occurrence, --angular-- should be inserted; claim 3, line 18, "indicatinng" should be --indicating--; claim 32, column 15, line 7, "comrising" should be --comprising--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents